US011173514B2

(12) United States Patent
Breault et al.

(10) Patent No.: US 11,173,514 B2
(45) Date of Patent: Nov. 16, 2021

(54) FLUID DISPENSER WITH ZERO DISPLACEMENT SEALING DEVICE

(71) Applicant: Henkel IP & Holding GmbH, Duesseldorf (DE)

(72) Inventors: John P. Breault, New Britain, CT (US); Ivan Johnson, Wallingford, CT (US)

(73) Assignee: Henkel IP & Holding GmbH, Duesseldorf (DE)

( * ) Notice: Subject to any disclaimer, the term of this patent is extended or adjusted under 35 U.S.C. 154(b) by 0 days.

(21) Appl. No.: 16/798,514

(22) Filed: Feb. 24, 2020

(65) Prior Publication Data

US 2020/0188950 A1 Jun. 18, 2020

Related U.S. Application Data

(63) Continuation of application No. PCT/US2018/048543, filed on Aug. 29, 2018.
(Continued)

(51) Int. Cl.
*B05C 11/10* (2006.01)
*B05C 5/02* (2006.01)
(Continued)

(52) U.S. Cl.
CPC ........ *B05C 5/0225* (2013.01); *B05C 11/1034* (2013.01); *F04B 13/00* (2013.01);
(Continued)

(58) Field of Classification Search
CPC ............. B05C 11/1034; B05C 11/1002; B05C 11/1013; B05C 5/0225; B05C 5/0237;
(Continued)

(56) References Cited

U.S. PATENT DOCUMENTS 3,895,748 A * 7/1975 Klingenberg ........... F16K 23/00
222/571
4,692,351 A * 9/1987 Maeda ................. H05K 3/1241
118/410
(Continued)

FOREIGN PATENT DOCUMENTS

CN 203245086 10/2013
RU 2417847 5/2011

OTHER PUBLICATIONS

International Search Report issued in connection with International Patent Application No. PCT/US2018/048543 dated Nov. 22, 2018.

*Primary Examiner* — Charles P. Cheyney
(74) *Attorney, Agent, or Firm* — Steven C. Bauman

(57) ABSTRACT

A fluid dispenser for dispensing small doses of fluid includes a dispenser housing, a diaphragm assembly, a displacement chamber, and a dispensing luer. The dispenser housing has a first end for receiving the fluid and a second end for dispensing the fluid. The dispenser housing defines a fluid flow path from a receiving chamber adjacent the first end to a dispensing chamber adjacent the second end. The diaphragm assembly includes a first diaphragm within the receiving chamber and a second diaphragm within the dispensing chamber wherein the first diaphragm is operably connected to the second diaphragm. The diaphragm assembly is movable between a first position wherein the first diaphragm moves the fluid from the receiving chamber to the dispensing chamber along the fluid flow path and a second position wherein the second diaphragm moves the fluid from the dispensing chamber to the displacement chamber.

17 Claims, 3 Drawing Sheets

Related U.S. Application Data

(60) Provisional application No. 62/551,487, filed on Aug. 29, 2017.

(51) Int. Cl.
*F04B 13/00* (2006.01)
*F04B 15/00* (2006.01)
*G01F 11/02* (2006.01)
*C09J 133/14* (2006.01)

(52) U.S. Cl.
CPC .............. *F04B 15/00* (2013.01); *G01F 11/02* (2013.01); *C09J 133/14* (2013.01)

(58) Field of Classification Search
CPC . B05C 5/001; B05C 5/02; F04B 13/00; F04B 15/00; G01F 11/02; B05B 1/28; B05B 1/30; C09J 133/14
USPC .......................................... 222/504, 214, 309
See application file for complete search history.

(56) References Cited

U.S. PATENT DOCUMENTS

| | | | | |
|---|---|---|---|---|
| 4,974,754 | A * | 12/1990 | Wirz | B01J 4/02 |
| | | | | 222/207 |
| 5,467,899 | A * | 11/1995 | Miller | B05C 11/1034 |
| | | | | 222/309 |
| 6,196,521 | B1 | 3/2001 | Hynes et al. | |
| 6,742,993 | B2 * | 6/2004 | Savard | F04B 43/04 |
| | | | | 417/53 |
| 7,083,113 | B2 * | 8/2006 | Kropp | F02M 57/025 |
| | | | | 239/124 |
| 8,757,511 | B2 * | 6/2014 | Ciardella | H01L 21/6715 |
| | | | | 239/93 |
| 9,254,642 | B2 * | 2/2016 | Ciardella | B41J 2/045 |
| 2007/0221126 | A1 | 9/2007 | Yajima | |
| 2012/0285999 | A1 * | 11/2012 | Breault | B05C 5/0225 |
| | | | | 222/571 |
| 2013/0048759 | A1 * | 2/2013 | Aguilar | B05B 1/304 |
| | | | | 239/562 |
| 2014/0263403 | A1 | 9/2014 | Conner et al. | |
| 2019/0388912 | A1 * | 12/2019 | Kader | F16K 1/36 |

* cited by examiner

FLUID DISPENSER WITH ZERO DISPLACEMENT SEALING DEVICE

BACKGROUND

Field

The present invention relates to fluid dispensers, and more particularly, to precision fluid dispensers configured with a zero displacement sealing device.

Brief Description of Related Technology

Currently, there exist various precision fluid dispensing systems for dispensing adhesive such as cyanoacrylate and anaerobically curable ones. Generally, these dispensing systems utilize a positive displacement pump to deliver the adhesive for dispensing. The positive displacement pump normally includes a sliding/dynamic seal. During repetitious dispensing by the fluid dispensing systems, the adhesive will cure or react with the sliding/dynamic seal. Specifically, when the adhesive comes in contact with pump components, for a period of time, curing of the adhesive will occur. This often causes the fluid dispensing system to have a failure and be inoperable until the sliding/dynamic seal is replaced. A ceramic positive displacement pump is currently available in the market to remedy this issue stated above. In the ceramic positive displacement pump, a ceramic piston is fitted into a ceramic cylinder. Specifically, the piston is sealed using an acidic fluid that is pumped between the cylinder and piston to ensure that the adhesive does not bond the two components together. Thus, this pump is dependable. However, the ceramic positive displacement pump is complicated to operate and very expensive. In addition, the pump needs a regular maintenance during shutdown.

Accordingly, although various precision fluid dispensing systems are currently available, further improvements are possible.

SUMMARY

According to an embodiment of the present invention, a fluid dispenser for dispensing small doses of fluid includes a dispenser housing, a diaphragm assembly, a displacement chamber, and a dispensing luer. The dispenser housing has a first end for receiving the fluid and a second end for dispensing the fluid. The dispenser housing defines a fluid flow path from a receiving chamber adjacent the first end to a dispensing chamber adjacent the second end. The diaphragm assembly includes a first diaphragm within the receiving chamber and a second diaphragm within the dispensing chamber wherein the first diaphragm is operably connected to the second diaphragm. The diaphragm assembly is movable between a first position wherein the first diaphragm moves the fluid from the receiving chamber to the dispensing chamber along the fluid flow path and a second position wherein the second diaphragm moves the fluid from the dispensing chamber to the displacement chamber. The displacement chamber is positioned adjacent the second end of the housing in communication with the dispensing chamber. The dispensing luer is in communication with the displacement chamber for dispensing the small doses of fluid upon movement of the diaphragm assembly to the second position.

These and other aspects of the present invention will be better understood in view of the drawings and following detailed description.

DETAILED DESCRIPTION

Figure 1:
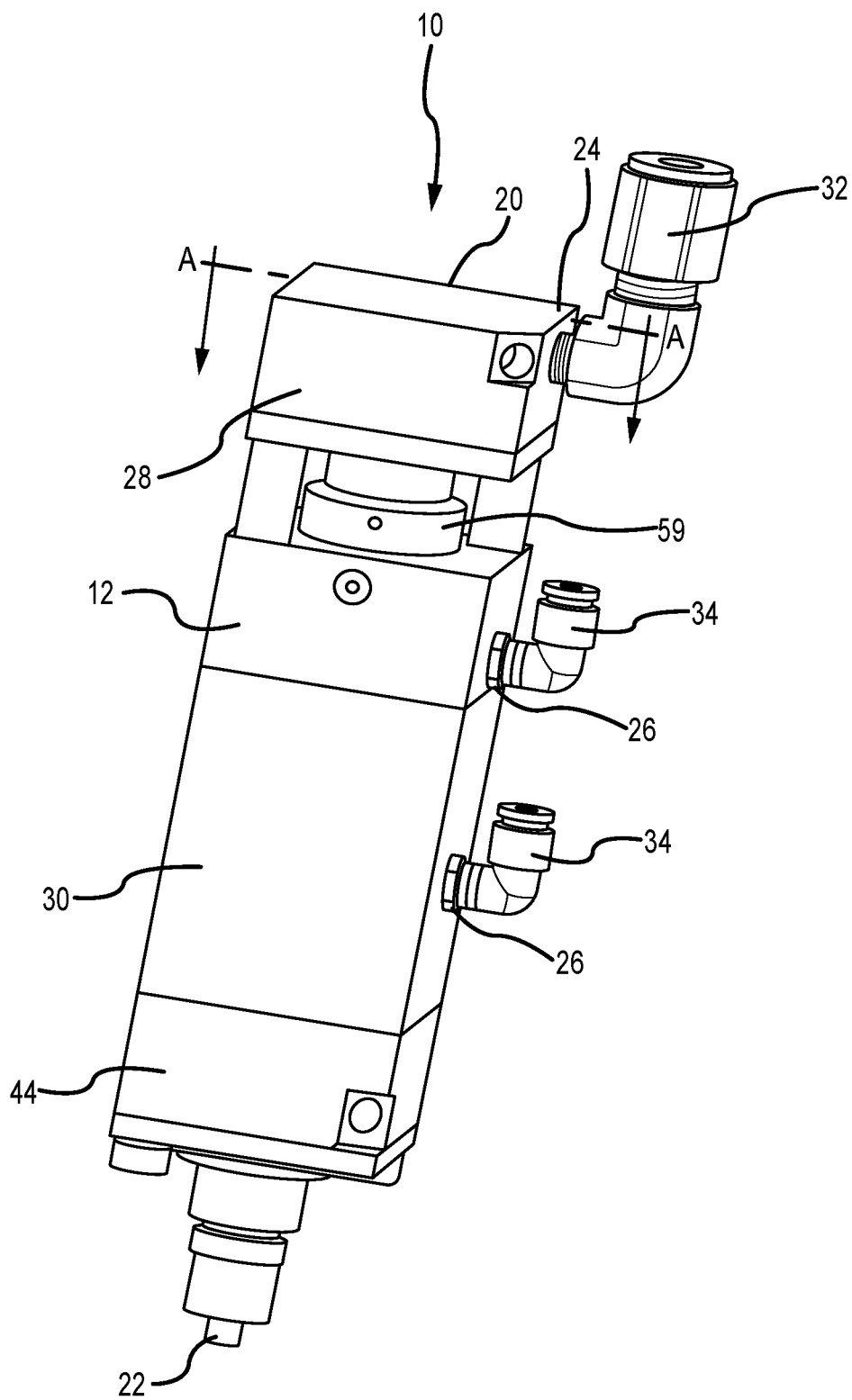
FIG. 1 is a perspective view of a fluid dispenser, according to an embodiment of the present invention.
Figure 2:
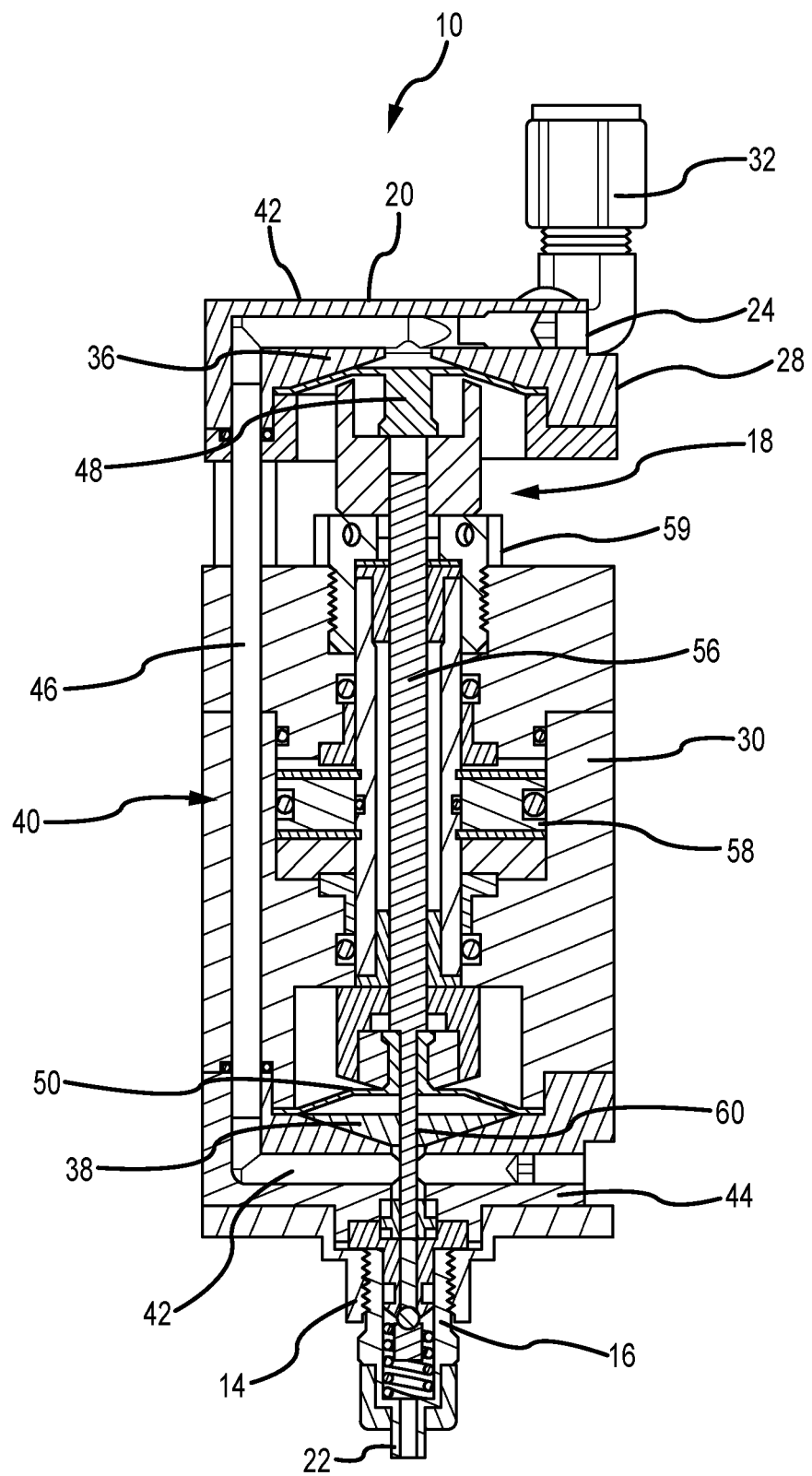
FIG. 2 is a cross-sectional view taken along line A-A of FIG. 1, in a first/open position.
Figure 3:
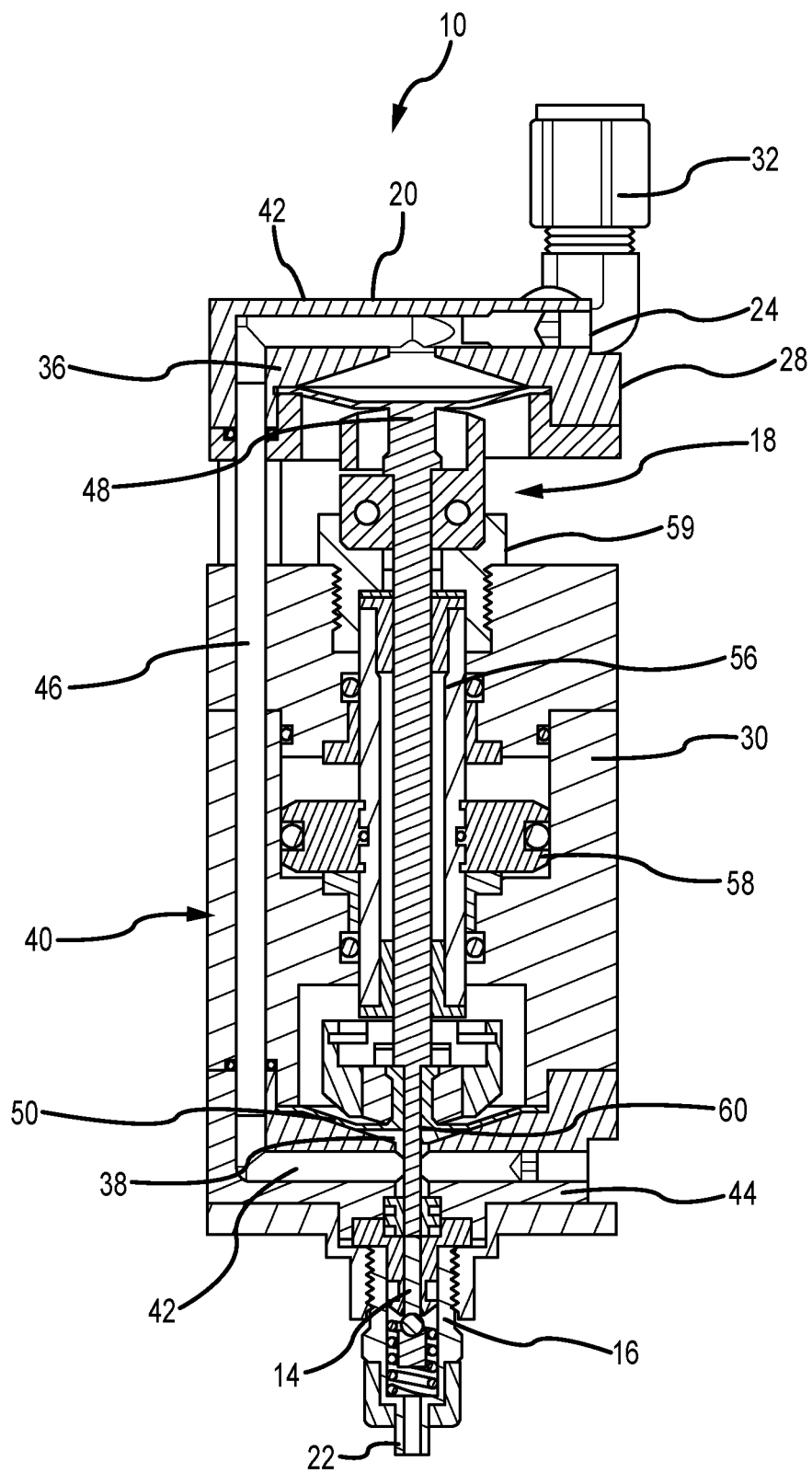
FIG. 3 is a cross-sectional view taken along line A-A of FIG. 1, in a second/closed position.

According to an embodiment of the present invention, referring to FIGS. 1-3, there is shown a fluid dispenser 10 designed and configured to dispense small and precise doses of fluid (e.g., an adhesive such as cyanoacrylate and anaerobically curable ones). The fluid dispenser 10 includes a dispenser housing 12, a displacement chamber 14 defined within the dispenser housing 12, a dispensing luer 16 for dispensing the small doses of fluid, and a zero displacement sealing device (a diaphragm assembly) 18 arranged within the dispenser housing 12 for allowing the fluid dispenser 10 to dispense consistent and precise volume of fluid, as will be described in greater detail below.

Directional terms, such as upward and downward are referenced to an orientation in which the dispensing luer 16 of the fluid dispenser 10 is pointing downward. However, the present invention is not thereby limited to use in any particular orientation.

Referring again to FIG. 1, the dispenser housing 12 is elongate and extends between a first end 20 and a second end 22. The first and second ends 20, 22 are for receiving the fluid and for dispensing the fluid, respectively, as will be described in greater detail below. A fluid input fitting hole 24 and a plurality of air fitting holes 26 are defined in a first end portion 28 of the dispenser housing 12 and in a middle portion 30 of the dispenser housing 12, respectively. A part of a fluid input fitting 32 and a part of an air fitting 34 are inserted and attached through the fluid input fitting hole 24 and the air fitting hole 26, respectively. The fluid input fitting 32 provides a fluid path between a fluid reservoir (not shown) and the fluid dispenser 10, whereas air is supplied to the fluid dispenser 10 through the plurality of air fittings 26 with an air pressure, preferably, 60 psi. The fluid is pressurized, preferably, between 5 psi and 50 psi.

Referring to FIGS. 2 and 3, a receiving chamber 36 and a dispensing chamber 38 are defined within the fluid dispenser 10 for containing the fluid to be dispensed. Specifically, the receiving chamber 36 is defined adjacent the first end 20 of the dispenser housing 12, and the dispensing chamber 38 is defined adjacent the second end 22 of the dispenser housing 12.

The dispenser housing 12 further defines a fluid flow path from the receiving chamber 36 to the dispensing chamber 38 for the fluid to travel therebetween. More specifically, a fluid tube 40 is disposed within the dispenser housing 12 to accommodate the fluid flow path therewithin. The fluid tube 40 is configured and arranged such that end portions 42 of the fluid tube 40 are horizontally disposed within the first end portion 28 and second end portion 44 of the dispenser housing 12, and a middle portion 46 of the fluid tube 40 is vertically disposed within the dispenser housing 12, with each end of the middle portion 46 of the fluid tube 40 connecting to each end of the end portions 42 of the fluid tube 40, as show in FIGS. 2 and 3. Thus, once the fluid enters the first end portion 28 of the dispenser housing 12 from a fluid reservoir (not shown) via the fluid input fitting 32, the fluid then travels along the fluid flow path via the fluid tube 40 and fills the receiving chamber 36, the dispensing chamber 38, and the displacement chamber 14.

Referring again to FIGS. 2 and 3, the diaphragm assembly 18 is arranged within the dispenser housing 12 and acts as a device for volumetric displacement of the fluid contained within the receiving chamber 36 and the dispensing chamber 38. The diaphragm assembly 18 includes substantially identical first and second diaphragms 48, 50, with the first diaphragm 48 arranged within the receiving chamber 36 and the second diaphragm 50 arranged within the dispensing chamber 38. This arrangement allows a lower end of the receiving chamber 36 and an upper end of the dispensing chamber 38 to be defined by the first diaphragm 48 and the second diaphragm 50, respectively.

The first diaphragm 48 is operably connected to the second diaphragm 50 for movement between a first/open position (FIG. 2) and a second/closed position (FIG. 3). Specifically, the first and second diaphragms 48, 50 are connected to each end of a connecting rod 56, respectively, which is disposed vertically within the dispenser housing 12 and bolted to an actuator 58. The length of an actuator stroke may be adjusted with a stroke adjustor 59. The movement of the first and second diaphragms 48, 50 will be described in greater detail below.

The fluid dispenser 10 further includes a displacement rod 60, which is disposed within the dispenser housing 12 and is positioned above the displacement chamber 14. The displacement chamber 14 is defined adjacent the second end 22 of the dispenser housing 12 and is in communication with the dispensing chamber 38.

The fluid dispenser 10 is made of one or more materials having suitable properties for a desired application, including strength, weight, rigidity, etc. Steel is preferred for the fluid dispenser 10. The receiving and dispensing chambers are configured and dimensioned such that they are substantially identical.

In operation of the fluid dispenser 10, before the fluid dispenser 10 dispenses the fluid, the diaphragm assembly 18 is initially in the first/open position, as shown in FIG. 2. In this position, the first diaphragm 48 and the second diaphragm 50 are fully extended and retracted, respectively, such that the fluid to be dispensed is contained within the dispensing chamber 38.

As the fluid dispenser 10 dispenses the fluid, the actuator 58 moves the connecting rod 56 linearly downward to reverse the position of each of the first and second diaphragms 48, 50 such that the diaphragm assembly 18 transitions to the second/closed position, as shown in FIG. 3. In the second position, the first diaphragm 48 and the second diaphragm 50 are fully retracted and extended, respectively, such that the receiving chamber 36 is filled with the fluid to be dispensed, and the fluid in the dispensing chamber 38 is moved to the displacement chamber 14 by the force exerted by the extension of the second diaphragm 50. Thus, the fluid volume in the dispensing chamber 38 decreases, and the fluid volume in the receiving chamber 36 increases. Since the receiving and dispensing chambers 36, 38 are substantially identical, when the fluid dispenser 10 dispenses the fluid, the volumetric displacement of the fluid in the receiving chamber 36 is equal to the volumetric displacement of the fluid in the dispensing chamber 38.

In addition, as the fluid dispenser 10 dispenses the fluid, the actuator 58 also moves the displacement rod 60 downward, forcing the displacement rod 60 to be placed within the displacement chamber 14. Thus, the displacement rod 60 pushes the fluid in the displacement chamber 14 to the dispensing luer 16 which is in communication with the displacement chamber 14. The dispensing luer 16 then dispenses the fluid from the fluid dispenser 10.

The diaphragm assembly 18 provides a higher energy transfer from the actuator 58 because the first and second diaphragms 48, 50 are unitized. This unitized sealing method creates a precise volume of the fluid to be dispensed and also creates a force balance between the first and second diaphragms 48, 50 as they move together. The force require to move the first and second diaphragms 48, 50 approaches zero as the projected area of one diaphragm increases and the other diaphragm decreases.

Once the fluid dispenser 10 dispenses the fluid, the actuator 58 moves the diaphragm assembly 18 linearly upward and transitions the diaphragm assembly 18 back to the first position. As stated above, in the first position, the first diaphragm 48 and the second diaphragm 50 are fully extended and retracted, respectively. Thus, the force exerted by the extension of the first diaphragm 48 allows the fluid in the receiving chamber 36 to move to the dispensing chamber 38 along the fluid flow path for dispensing.

From the foregoing, it will be appreciated that a fluid dispenser according to the present invention dispenses small doses of fluid while enhancing precision of fluid volume to be dispensed and longevity of the fluid dispenser.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and of the claims appended hereto.

What is claimed is:

1. A fluid dispenser for dispensing small doses of fluid comprising:
   a dispenser housing, the dispenser housing having a first end for receiving the fluid and a second end for dispensing the fluid, the dispenser housing defining a fluid flow path from a receiving chamber adjacent the first end to a dispensing chamber adjacent the second end;
   a diaphragm assembly including:
      a first diaphragm within the receiving chamber and a second diaphragm within the dispensing chamber, the first diaphragm being operably connected to the second diaphragm for movement between a first position and a second position;
      a displacement chamber adjacent the second end of the dispenser housing in communication with the dispensing chamber, the diaphragm assembly being movable between the first position wherein the first diaphragm moves the fluid from the receiving chamber to the dispensing chamber along the fluid flow path and the second position wherein the second diaphragm moves the fluid from the dispensing chamber to the displacement chamber;
      a dispensing luer in communication with the displacement chamber for dispensing the small doses of fluid upon movement of the diaphragm assembly to the second position; and
      a connecting rod,
   wherein the first and second diaphragms are attached to each end of the connecting rod, respectively.

2. The fluid dispenser of claim 1, wherein, in the first position, the first diaphragm and the second diaphragm are fully extended and retracted, respectively.

3. The fluid dispenser of claim 1, wherein, in the second position, the first diaphragm and the second diaphragm are fully retracted and extended, respectively.

4. The fluid dispenser of claim 1, wherein the fluid dispenser further comprise a fluid tube to accommodate the fluid flow path.

5. The fluid dispenser of claim 4, wherein the fluid tube is configured and arranged such that end portions of the fluid tube are horizontally disposed within first and second end portion portions of the dispenser housing, and a middle portion of the fluid tube is vertically disposed within the dispenser housing, with each end of the middle portion of the fluid tube connecting to each end of the end portions of the fluid tube.

6. The fluid dispenser of claim 4, wherein, when the fluid enters from the first end of the dispenser housing, the fluid travels through the fluid tube and fills the receiving chamber, the dispensing chamber, and the displacement chamber.

7. The fluid dispenser of claim 1, wherein the fluid dispenser further comprises a displacement rod, which is disposed within the dispenser housing and positioned above the displacement chamber.

8. The fluid dispenser of claim 1, wherein the fluid dispenser further comprises an actuator disposed within the dispenser housing.

9. The fluid dispenser of claim 8, wherein, as the fluid dispenser dispenses a dose of the fluid, the actuator moves the displacement rod into the displacement chamber, causing the fluid within the displacement chamber to exit the fluid dispenser.

10. The fluid dispenser of claim 1, wherein an input fitting hole is defined at the first end of the dispenser housing, through which a portion of an input fitting is inserted and attached.

11. The fluid dispenser of claim 1, wherein a plurality of air fitting holes are defined on the dispenser housing, through which a part of an air fitting is inserted to attached.

12. The fluid dispenser of claim 8, wherein the connecting rod is bolted to the actuator.

13. The fluid dispenser of claim 1, wherein the fluid is an adhesive.

14. The fluid dispenser of claim 1, wherein the fluid is cyanoacrylate.

15. The fluid dispenser of claim 1, wherein the first and second diaphragms are substantially identical.

16. The fluid dispenser of claim 1, wherein the receiving and dispensing chambers are substantially identical.

17. The fluid dispenser of claim 1, wherein the fluid is anaerobically curable.

* * * * *